(12) United States Patent
Archibald et al.

(10) Patent No.: US 7,383,202 B2
(45) Date of Patent: *Jun. 3, 2008

(54) SYSTEM AND METHOD FOR AUTOMATIC PRICING OF REMOTELY HOSTED APPLICATIONS

(75) Inventors: Chad Archibald, Walnut Creek, CA (US); Steven Wayne Earl, Lake Oswego, OR (US); Thomas E. McEvilly, Atlanta, GA (US); Deepak Gupta, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/736,856

(22) Filed: Apr. 18, 2007

(65) Prior Publication Data

US 2007/0192131 A1 Aug. 16, 2007

Related U.S. Application Data

(63) Continuation of application No. 10/242,227, filed on Sep. 11, 2002, now Pat. No. 7,222,084.

(60) Provisional application No. 60/322,598, filed on Sep. 11, 2001.

(51) Int. Cl.
 *G06Q 99/00* (2006.01)
(52) U.S. Cl. .............................. 705/10; 705/1; 709/203; 709/226
(58) Field of Classification Search ................ 705/35, 705/53, 1, 10; 709/203, 229, 226
See application file for complete search history.

(56) References Cited

U.S. PATENT DOCUMENTS

| | | | | | |
|---|---|---|---|---|---|
| 5,410,598 | A | * | 4/1995 | Shear | 705/53 |
| 5,949,975 | A | * | 9/1999 | Batty et al. | 709/213 |
| 6,230,204 | B1 | * | 5/2001 | Fleming, III | 709/229 |
| 6,816,882 | B1 | * | 11/2004 | Conner et al. | 709/203 |
| 6,904,449 | B1 | * | 6/2005 | Quinones | 709/203 |
| 7,222,084 | B2 | * | 5/2007 | Archibald et al. | 705/10 |

(Continued)

FOREIGN PATENT DOCUMENTS

EP 1128309 A2 2/2001

(Continued)

OTHER PUBLICATIONS www.mysap.com.*

(Continued)

*Primary Examiner*—John W. Hayes
*Assistant Examiner*—Freda A. Nelson
(74) *Attorney, Agent, or Firm*—Townsend and Townsend and Crew LLP

(57) ABSTRACT

Automatic pricing of remotely hosted applications permits users to enter customer data and flexibly prices various product offerings, product lines, and applications. An initial build of a computer system, modifications to an existing computer system configuration, extended services, and enhancements are incorporated. Errors are checked for and can be corrected. Using the invention, a sales team can quickly and efficiently price products and services at the inception of a business relationship, and can easily modify prices during the business relationship.

30 Claims, 16 Drawing Sheets

U.S. PATENT DOCUMENTS

2003/0018551 A1* 1/2003 Hanson et al. ................ 705/35

FOREIGN PATENT DOCUMENTS

| EP | 1128309 A2 * | 2/2001 |
| EP | 1128309 A2 * | 8/2001 |

OTHER PUBLICATIONS

"SAP and eOnline Forge Application Hosting Alliance", Aug. 24, 1999, Business Wire.*
"AISP ebaseOne selects NARUS IBI Solutions to Enable Usage-Based Billing for Hosted Applications", May 19, 2000.*
"Portal Announces Multiple Customer Wins and Relationships in ASP and Internet Business Service Market", Apr. 24, 2000, Business Wire, p. 1149.*
Edwards, Morris, "The clamor for hosted applications", Jan. 2000, Communications News, v37, n1, p. 94.*
Edwards, Morris; "The Clamor for Hosted Applications"; Jan. 2000, Communication News; pp. 94-95.*
Hicks, Matt; "Great ASP-irations"; Sep. 6, 1999; PC Weel, p. 67, 5 pgs.*
*SAP and eOnline Forge Application Hosting Alliance*; Business Wire; Aug. 24, 1999; 2006 Business Wire.
*AISP ebaseOne Selects NARUS IBI Solutions to Enable Usage-Based Billing for Hosted Applications*;PR Newswire; May 19, 2000; 2006 The Gale Group.
Edwards, Morris; *The Clamor for Hosted Applications*; Communications News; Jan. 2000, p. 94, v37, n1; ISSN: 0010-3632; 2006 The Gale Group.
www.mysap.com, May 5, 2001.
*Portal Announces Multiple Customer Wins and Relationships in ASP and Internet Business Service Market*; Business Wire; Apr. 24, 2000, p. 1149; 2006 The Gale Group.

* cited by examiner

PeopleSoft eCenter.
v155

Hosting Survey

Customer Details

| | |
|---|---|
| Customer Name: | eCenter Business Development Manager: |
| Customer Primary Contact: | PeopleSoft Sales Rep: |
| Customer's Annual Revenue: | PeopleSoft Consulting Contact: |
| Customer Industry Segment: | Implementation Partner Name: |
| Customer Location: | Customer Time Zone: |
| Implementation Start Date: | Total PeopleSoft License Value: |
| Production Go-Live Date: | List Competitors Involved: |

Deal Status:

Deal Final Summary:

Brief Company Profile:

Compelling Event: (What is driving the customer to a hosted model?)

Describe the Customer's Decision Process:

List any Competitive Details: How do we differ from the competitors?

Applications Being Hosted

Customer is (New or Existing)

If an existing customer put a (Y/N) in all the boxes that apply:

Platform Migration Required (Y/N) ** Migrations are required when there is an existing customer on a different hardware and database platform than the eCenter standard.

If migrations are required, please fill in this chart.

| Source Database Type | Source Hardware Type | Who will perform the migration? | Where will the migration occur? |
|---|---|---|---|
| | | | |

Upgrade Required (Y/N)

If upgrades are required, please fill in this chart.

| Product Line | (Y/N) | Source Version | Target (Upgraded) Version | Will the upgrade occur on eCenter Hardware? (Y/N) |
|---|---|---|---|---|
| HRMS | | | | |
| Financials/SCM | | | | |
| CRM | | | | |
| EPM | | | | |
| Portals | | | | |
| Learning Solutions | | | | |

Who will perform the upgrade(s)?

*Note: If the customer has extensive customizations an eAssessment will be needed.*

Will this customer be migrating enhancements? (Y/N)   Y

FIG. 14

Exhibit A - Enhancement Assessment & Pricing

| Enter QTY Count | | Total Points |
|---|---|---|
| | Customer: | 0 |
| | Print This Sheet | |
| | Clear This Sheet | |
| | Level 1 | |
| | Translate value | - |
| | New query, no join | - |
| | New query, join | - |
| | Total Level 1 | |
| | Level 2 | |
| | New Crystal report | - |
| | New nVision layout/report | - |
| | New fields | - |
| | New menu | - |
| | Add new table (use standard new table naming convention) | - |
| | Add new panel/page | - |
| | Add new panel group/component | - |
| | Add new PeopleCode to new table/page | - |
| | Total Level 2 | |
| | Level 3 | |
| | New SQR, AE, or Cobol that executes SQL against new table | - |
| | Modify existing query | - |
| | Modify existing Crystal report | - |
| | Modify existing nVision report/layout | - |
| | Panel/page label change (no table alter) | - |
| | Modify existing menu | - |
| | Table alter (non-key fields) | - |
| | New Index | - |
| | Modify delivered application messaging | - |
| | Add new field to existing panel | - |
| | Total Level 3 | |
| | Level 4 | |
| | Edit PeopleCode on existing table/page | - |
| | Edits to existing SQR, AE or Cobol | - |
| | Total Level 4 | |
| | Total Points | - |
| | Percent of Monthly Hosting Fees: | 0.00% |

Refer to the Master Hosting Agreement for Enhancement terms and definitions.
Any fees and costs in connection with support, maintenance or upgrades of Enhancements are the sole responsibility of the Customer.

SYSTEM AND METHOD FOR AUTOMATIC PRICING OF REMOTELY HOSTED APPLICATIONS

CROSS-REFERENCE TO RELATED APPLICATIONS

This application is a continuation of U.S. patent application Ser. No. 10/242,227, filed on Sep. 11, 2002, which claims the benefit of U.S. Provisional Application No. 60/322,598, filed on Sep. 11, 2001. The subject matter of the related applications are hereby incorporated by reference.

BACKGROUND OF THE INVENTION

1. Technical Field

The present invention relates generally to pricing computer services and more particularly to pricing remote hosting of applications by an Application Service Provider (ASP).

2. Discussion of Prior Art

Business organizations commonly establish computer centers for hosting software applications such as corporate e-mail systems and human resources systems. The increasing complexity of designing, operating, and maintaining software applications, and administering computer systems to host the applications, has increased personnel costs and often delayed the rollout of new software applications and computer systems into production environments.

Application Service Providers (ASPs), through centralization and economics of scale, resolve delays and minimize costs by providing the service of hosting software applications for customers wanting to be relieved of hosting applications themselves. ASPs typically set up large computer systems, install software applications on the systems, employ personnel to administer the systems and applications, and, through networks, service remote access customers. The customer's remaining concerns are its requirements for software applications and the terms of their Service Level Agreement (SLA) with the ASP.

ASPs have various ways of pricing their services. Some ASPs charge for use of a computer system separately from charges for use of a software application. Other ASPs charge by user accesses to computer systems and software applications. ASPs also charge costs for licensing software applications. Conventional pricing methodologies are typically carried out manually and slowly, which hinders sales by an ASP. Therefore, what is needed is an automated yet flexible method for automatically pricing remotely hosted applications.

BRIEF SUMMARY OF THE INVENTION

The methodology for pricing services of an application service provider includes choosing a base product offering, pricing the base product offering, pricing extended services, calculating a total price for all chosen products and services, checking for errors in pricing, and presenting a summary of pricing. The uniqueness of the pricing methodology includes the combination of user categories over time periods and fixed price services that scale, as the customer needs further expansion of services.

Automatic pricing of remotely hosted applications permits users to enter customer data and flexibly prices various product offerings, product lines, and applications. An initial build of a computer system, modifications to an existing computer system configuration, extended services, and enhancements are incorporated.

The system for automatically pricing remotely hosted applications includes at least one computing device, a network for communicating from external connections to the computing device(s), pricing models, and a pricing calculator which runs on the computing device to determine prices based on the pricing models.

Using the invention, a sales team can quickly and efficiently price products and services at the inception of a business relationship, and can easily modify prices during the business relationship.

BRIEF DESCRIPTION OF THE DRAWINGS

FIG. 14 is a screenshot of a hosting survey in accordance with the invention;

FIG. 15 is a screenshot of an enhancement worksheet in accordance with the invention; and FIG. 16 is a screenshot of an application product line worksheet in accordance with an embodiment of the invention.

DETAILED DESCRIPTION OF THE INVENTION

A competitive advantage can be achieved by an ASP sales force through pricing its customer services as soon as possible. This is facilitated by automating pricing methods and accommodating low start-up fees.

Figure 1:
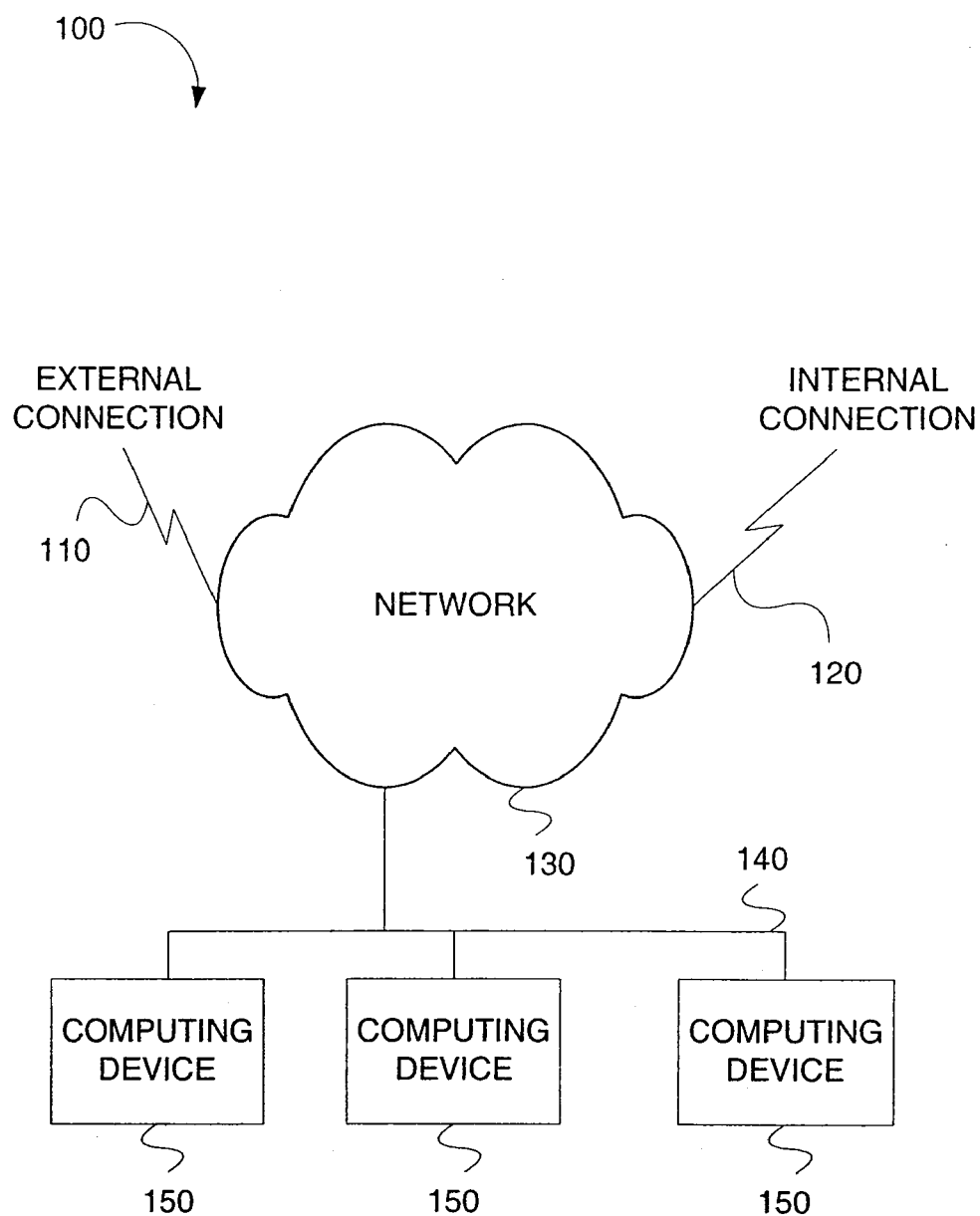
FIG. 1 illustrates a computer system and network suitable for use by an ASP for automatically pricing, and remotely hosting, applications in accordance with the invention.

FIG. 1 is an overview of a computer system and network 100 suitable for use by an ASP for automatically pricing and remotely hosting applications in accordance with the invention. System 100 includes an external connection 110, an internal connection 120, a network 130, a local network 140, and at least one computing device 150. External connection 100 and internal connection 120 are communication paths from an internet work (e.g., the Internet, internal/external networks, or computer systems, not shown) to network 130. Network 130 in turn is coupled through local network 140 to computing devices 150. Network 130 and local network 140 can be any network topology, such as a ring, bus, or star, can be a Local Area Network (LAN) or a Wide Area Network (WAN), and can be landline-based on fiber or copper cable, or wireless based on RF or infrared transmissions. Computing device(s) 150 can be a desktop or laptop computer, a server, a Personal Digital Assistant (PDA), or a PDA integrated with a wireless mobile phone. One computing device 150 can transfer data via local network 140 to a second computing device 150 or via network 130 to the Internet, internal/external networks, or other computer systems.

A system for automatic pricing according to the invention can also be embodied in a stand alone computing device 150 or in multiple computing devices 150 coupled to local network 140 not connected to a network 130.

Figure 2:
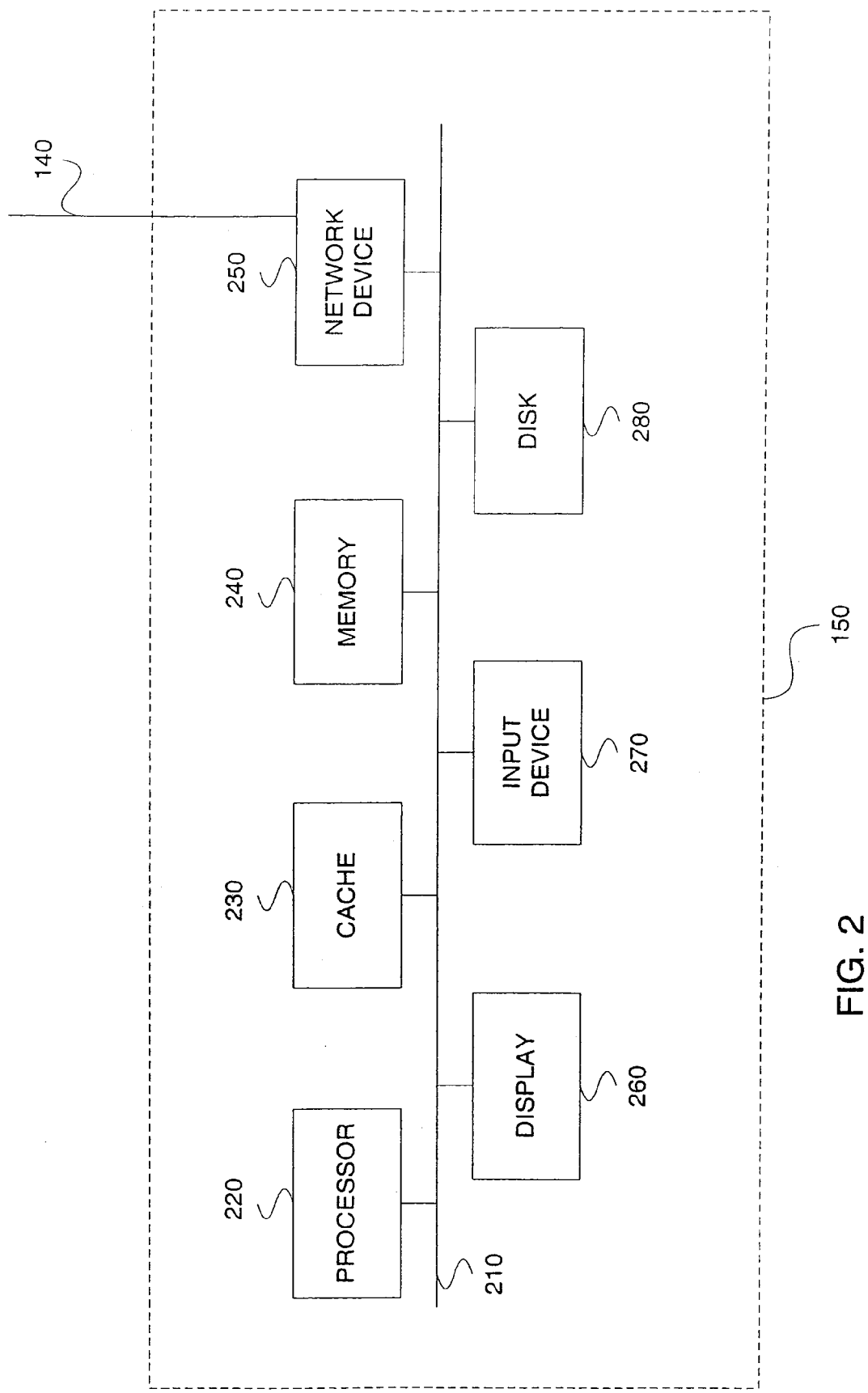
FIG. 2 is a diagram of a computing device of FIG. 1.

FIG. 2 is a diagram of FIG. 1 computing device 150 which, in an exemplary embodiment, includes at least one processor 220, a cache memory 230, a main memory 240, a network device 250, a display 260, an input device 270, and a hard disk 280, coupled together via a local bus 210.

Local bus 210 can be a Peripheral Component Interconnect (PCI) bus or an Industry Standard Architecture (ISA) bus. Processor 220 is a suitable Central Processing Unit (CPU). Cache memory 230 is a volatile memory, which stores data temporarily and loses any stored data when power to computing device 150 is shut-off. Memory 240, sometimes referred to as Random Access Memory (RAM), is also volatile memory but stores more data for longer times, and accesses the data more slowly, than cache 230. Alternatively, memory 240 can be non-volatile memory such as Non-Volatile Random Access Memory (NVRAM), which will not lose data when power to computing device 150 is shut-off.

Disk 280, which is non-volatile memory for data storage, is slower, but can store more data, than memory 240. Network device 250 enables data to travel between computing device 150 and local network 140 (FIG. 1). Display 260 can be a CRT monitor, an LCD screen, or a projection system. Input device 270, which receives data, can be a keyboard, a keypad, a pointer device, a writing area such as an electronic writing tablet, or a touch sensitive screen.

Other embodiments of computing device 150 can include multiple processors 220 and components such as soundcards and multimedia cards for enhanced data transmission and reception. Typically, a human user of a calculator interacts with computing device 150 to automatically price remotely hosted applications for one or more customers (not shown).

Figure 3:
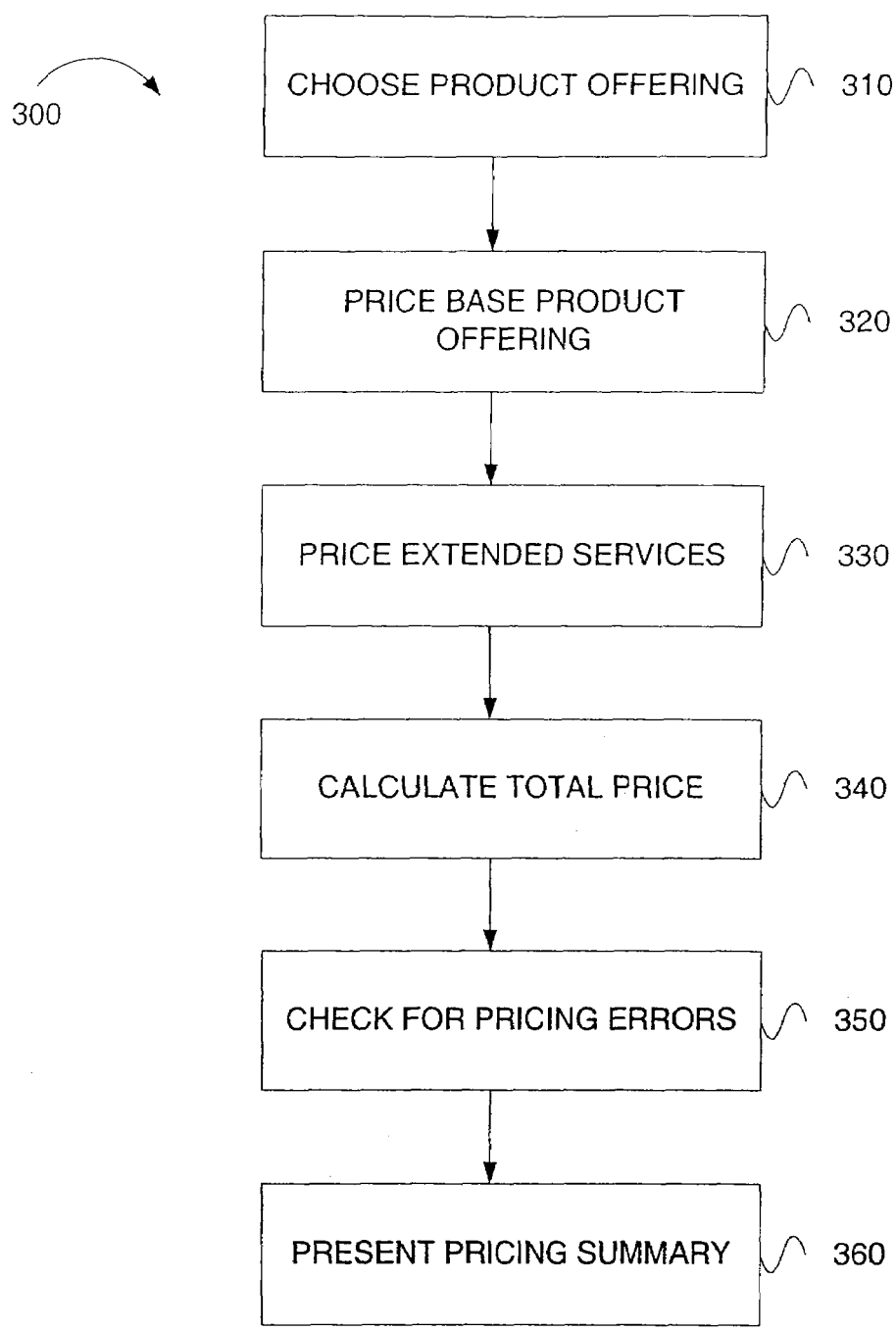
FIG. 3 is a high-level flowchart of generalized steps for automatically pricing remotely hosted applications in accordance with the invention.

FIG. 3 is a high-level flowchart of generalized steps in a method 300 for automatically pricing remotely hosted applications in accordance with the invention. In step 310, a calculator user chooses a base product offering. In one embodiment as detailed in FIG. 4 the user can choose among four products, labeled for example "OnRamp," "Accelerated," "Flex," and "Concierge." In another embodiment (not shown) a user can choose among two products. Other, and various numbers of, labels and product offerings can be made available to users without departing from the spirit of the invention.

In step 320 computing device 150 calculates the base product offering pricing. As explained below with reference to FIG. 6, the user can select options that affect the pricing of the base product offering. In step 330 the user can select extended services that affect pricing. In step 340, computing device 150 calculates the total price for the selected remotely hosted applications. In step 350, the user and computing device 150 can check for, and correct, errors in pricing. Finally, in step 360, computing device 150 presents a pricing summary for the user to review. These generalized steps of method 300 are detailed in FIGS. 4 through 12.

Figure 4:
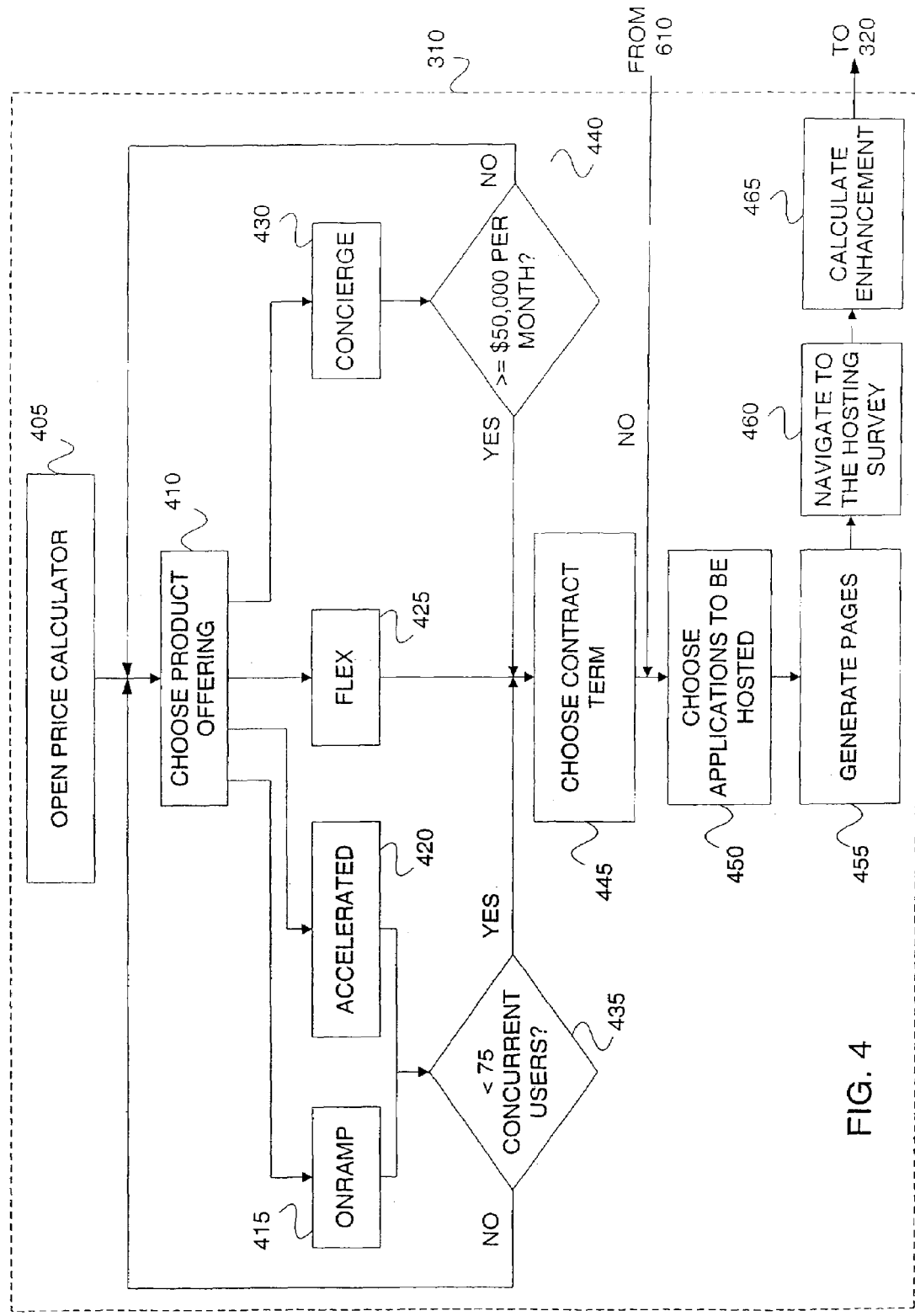
FIG. 4 is a flowchart of steps for choosing a product offering in step 310 of FIG. 3 in accordance with an embodiment of the invention.

FIG. 4 shows details of FIG. 3 step 310 for choosing a product offering. In step 405, the user opens a price calculator, which in one embodiment, is a conventional spreadsheet programmed for the user to select menu choices from and to enter data into. In other embodiments the price calculator can be a proprietary software program with a visual display using any graphic programming tool. For example the graphic programming tool can include Microsoft™ Visual Basic, Motif, OpenWindows, or Java. The user can select menu choices and enter data in the visual display.

In step 410, the user chooses a product offering of which, in an exemplary embodiment, there are four.

As a first choice the user can take step 415 of selecting the product offering identified as "OnRamp." OnRamp is a low cost, rapid deployment option for hosting basic product lines such as Human Resources Management System (HRMS) software, financial applications, and Customer Relationship Management (CRM) software.

As a second choice the user can take step 420 of selecting the product offering identified as "Accelerated," which provides the same basic product lines as OnRamp but, for convenience, product lines are selected for the user by computing device 150 (FIG. 1).

As a third choice the user can take step 425 of selecting the product offering identified as "Flex," which provides a flexible selection of product lines and hosting options for unique business processes. In addition to OnRamp product lines, Flex can provide applications such as student administration software and supply chain management software.

As a fourth choice the user can take step 430 of selecting the product offering identified as "Concierge," which is similar to Flex but also provides a high level of customer service, extended management support, and extended application and product line support.

In an exemplary embodiment, the user can select one of the four product offerings. However, in future embodiments a user could simultaneously select multiple product offerings.

If the calculator user has selected OnRamp step 415 or Accelerated step 420, then in step 435 computing device 150 checks whether there will be more or fewer than 75 concurrent product users for the selected product line(s). If there will be 75 or more concurrent product users, then the method returns to step 410 and the calculator user must choose another product offering. However, if there will be fewer than 75 concurrent product users, then the calculator user proceeds to step 445.

If the calculator user has selected Concierge then in step 440 computing device 150 checks if the customer will spend at least $50,000 per month. If not, then the method returns to step 410 and the calculator user must choose another product offering. However, if the customer will spend at least $50,000 per month then the user proceeds to step 445.

In step 445, the user selects a contract term of preferably 12, 24, 36, 48, or 60 months. Longer and/or shorter terms can be permitted or required.

Figure 13:
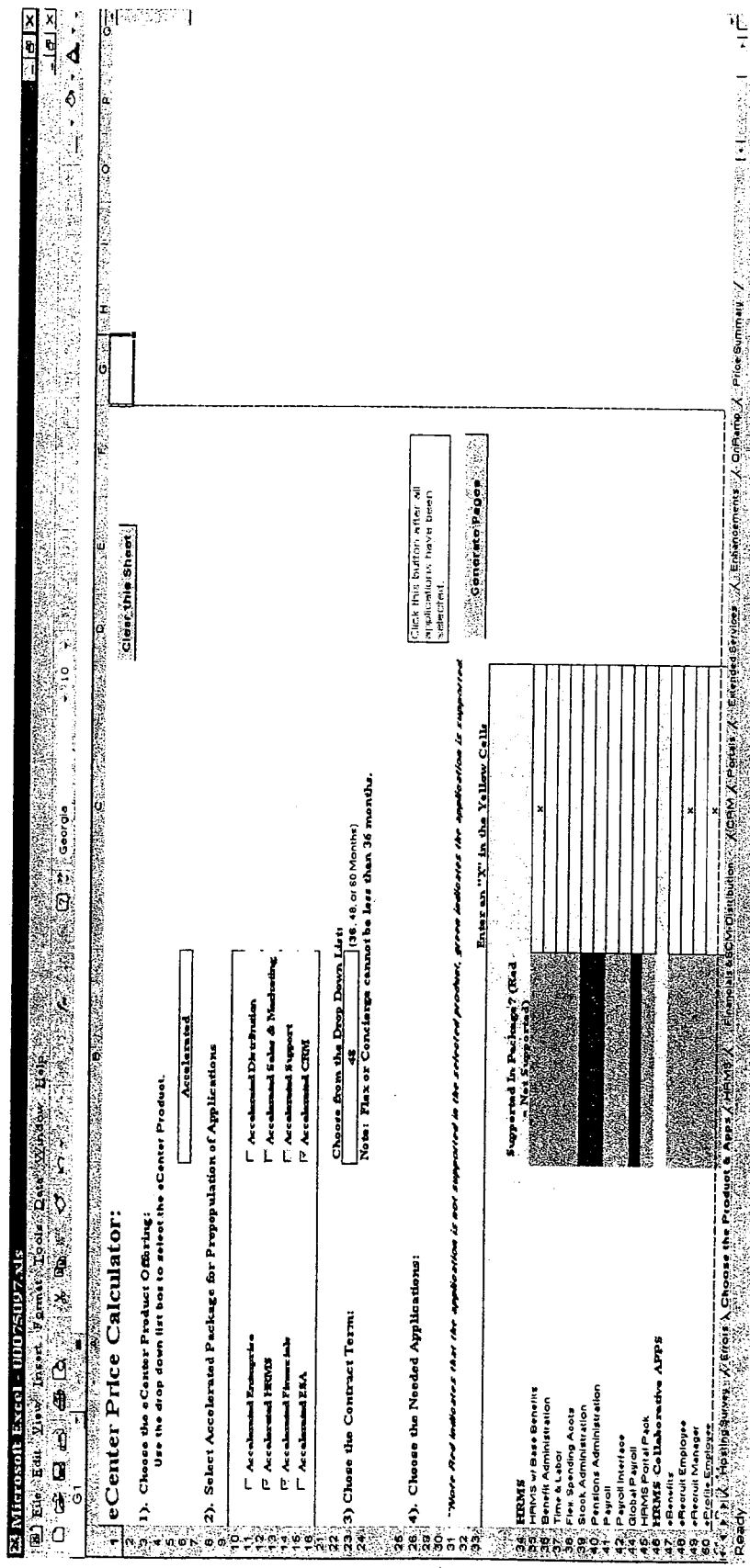
FIG. 13 is a screenshot of multiple worksheets of a price calculator in accordance with an embodiment of the invention.

In step 450, the user can choose multiple product lines and applications to be hosted. Then in step 455 the user selects in the spreadsheet a button labeled "Generate Pages" in response to which computing device 150 display 260 displays multiple worksheets as shown in FIG. 13. The user can enter more data on the multiple worksheets for calculations by computing device 150. In another embodiment the multiple worksheets can be multiple visual displays from a proprietary software program. The Generate Pages button can be removed for another type of user selection graphic for viewing the multiple visual displays.

One worksheet generated by computing device 150 in step 455 is a hosting survey as shown in FIG. 14. In step 460, the user navigates to the hosting survey, shown as a worksheet tab selection in FIG. 13. Next, in step 465, the user enters data for an enhancement calculation.

Figure 5:
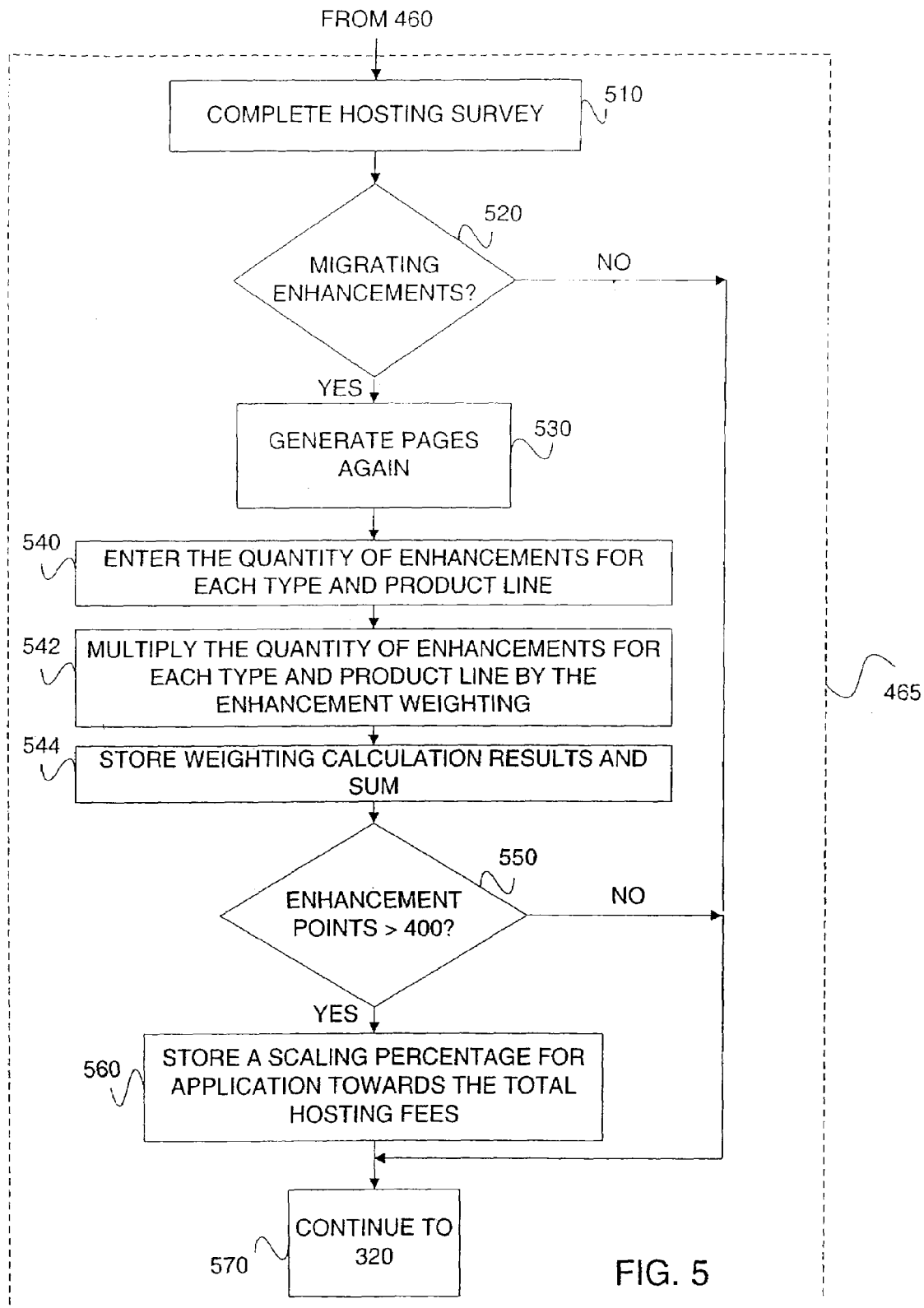
FIG. 5 is a flowchart of steps for calculating enhancements in step 465 of FIG. 4 for choosing a product offering in accordance with an embodiment of the invention.

FIG. 5 is a flowchart detailing FIG. 4 step 465 for calculating enhancements to the chosen product offering. An enhancement is any addition or modification, to any hosted software product line or application, by the user or customer. In step 510, the user can complete the hosting survey with customer data. In another embodiment, a sales team user can complete the hosting survey with customer data. Further, customer data can be automatically populated on the hosting survey with data transmitted via network 130 (FIG. 1).

In step 520, if the customer is not migrating enhancements then the method proceeds through step 570 to FIG. 3 step 320.

In step 520, if the customer is migrating enhancements then in step 530 the user selects the button labeled "Generate Pages again" as shown in FIG. 13, and computing device 150 displays an enhancements worksheet as shown in FIG. 15. Next, in step 540, the user enters the quantity of enhancements by type and product line. For example, an enhancement can include adding a table and modifying an existing report layout that is prepackaged with a hosted software product line. In step 542, computing device 150 multiplies the quantity of enhancements for each type and product line by an enhancement weighting. For example, the weighting can be scaled from 2 to 5. Subsequently, in step 544, computing device 150 stores the enhancement weighting calculation results and sum total of enhancements. In step 550, if the quantity of enhancement points is less than or equal to 400, then the method proceeds through step 570 to FIG. 3 step 320.

Alternatively, in step 550, if the quantity of enhancement points is greater than 400 then in step 560 computing device 150 stores a scaling percentage for the enhanced product line or application, for the ultimate calculation of the total fees. After storing the scaling percentage, the method proceeds through step 570 to FIG. 3 step 320.

Figure 6:
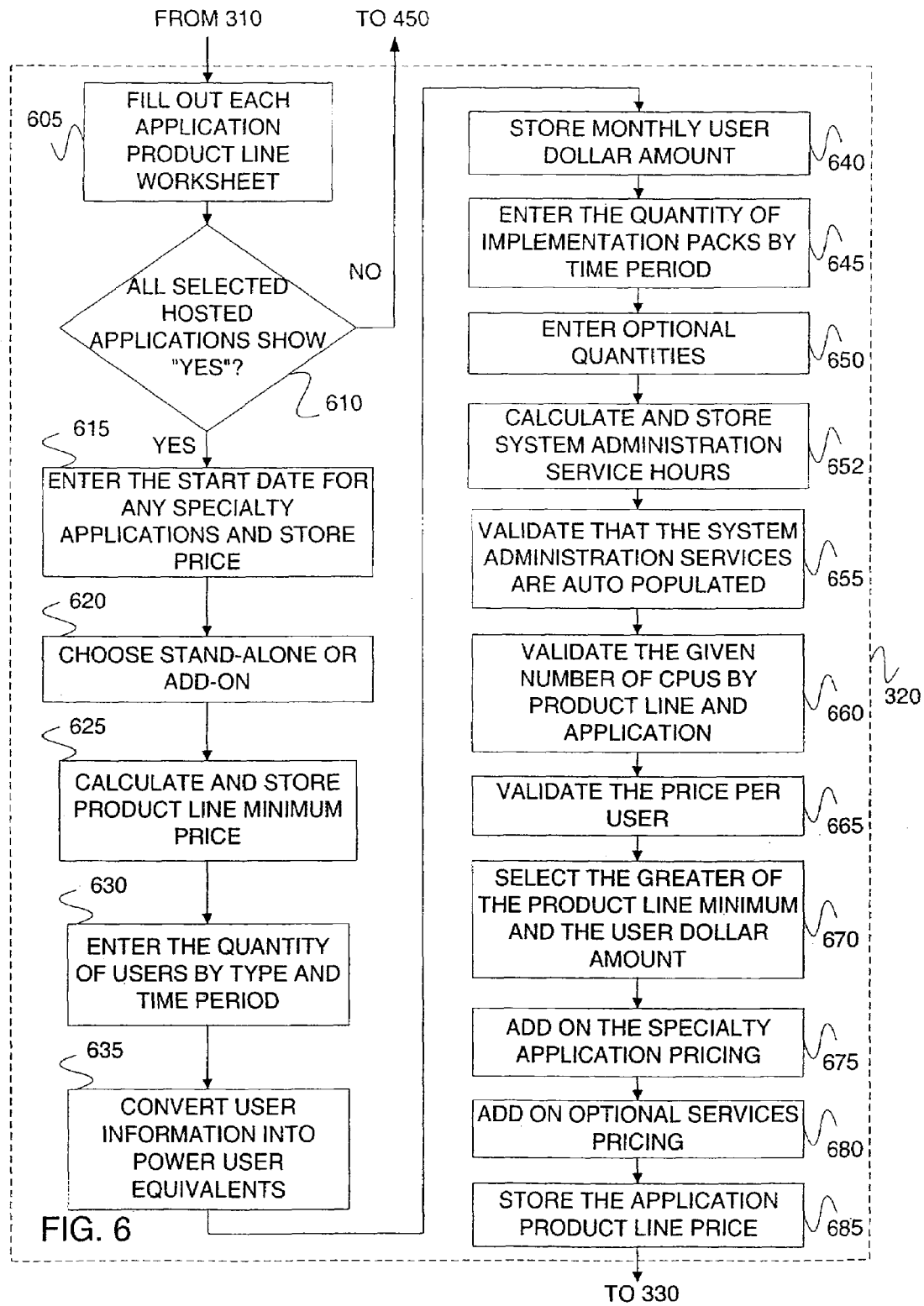
FIG. 6 is a flowchart of steps for pricing a base product offering in step 320 of FIG. 3 in accordance with an embodiment of the invention.
Figure 16:
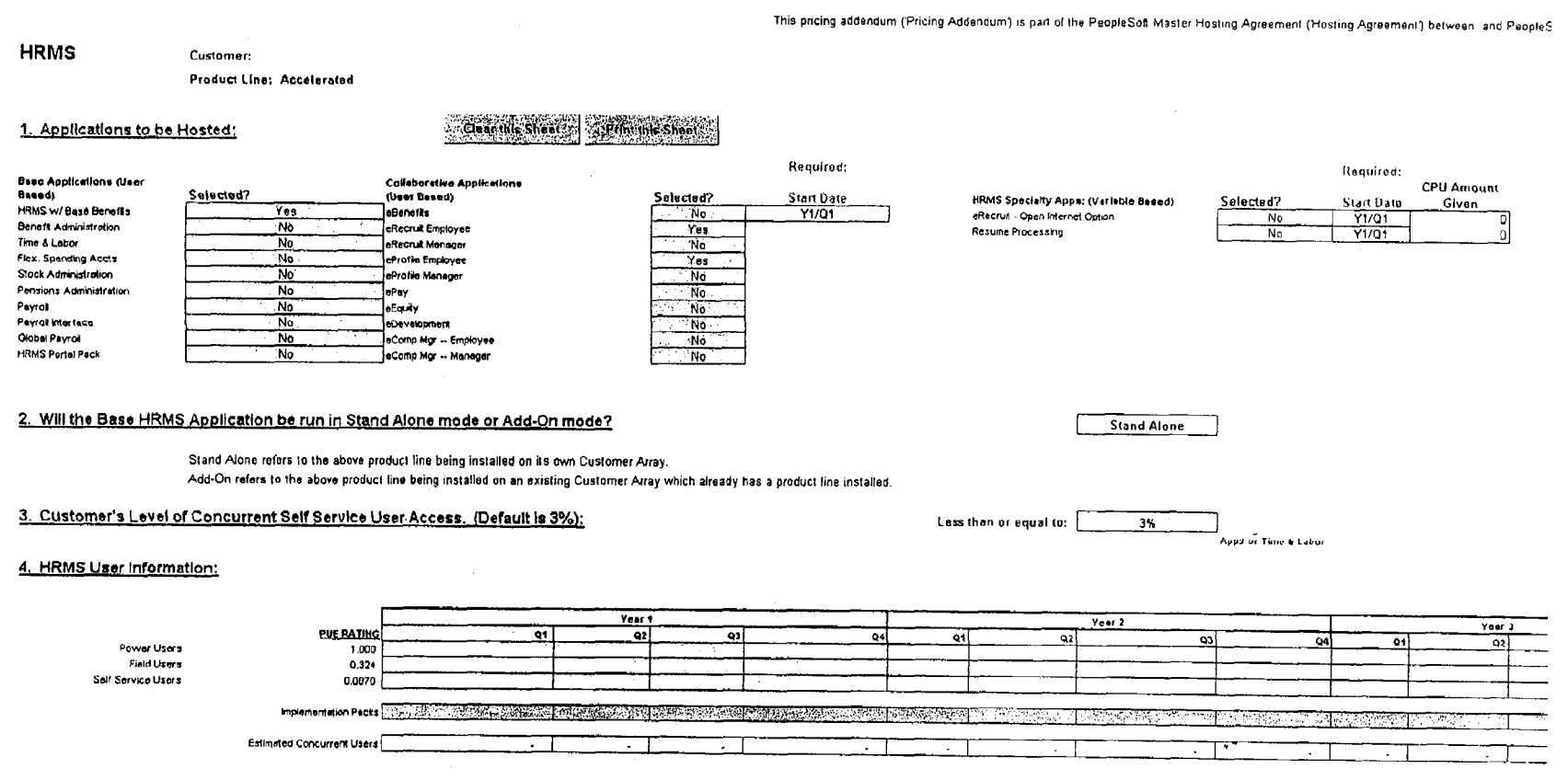

FIG. 6 is a flowchart showing details of FIG. 3 step 320 for pricing a base product offering. In step 605, the user fills out a worksheet as shown in FIG. 16 for each application product line. For example, if the user selected Customer Relationship Management (CRM) and Human Resources Management System (HRMS) product lines, then the user fills out CRM and HRMS worksheets. In step 610, the user confirms that all selected hosted applications show "Yes." For example as shown in FIG. 16 if the user selects HRMS then the cells associated with the labeled cells under "Base Applications" will show a "Yes" for selected applications. If the user cannot confirm that all selected hosted applications show "Yes" then the user returns to step 450 (FIG. 4) to choose multiple product lines and applications to be hosted. If the user confirms that all selected hosted applications show "Yes" then the method proceeds to step 615.

In an exemplary embodiment all product lines and applications can be categorized as user-based applications and specialty applications.

User-based applications can include basic product lines such as Human Resources management System (HRMS) software, financial applications, and Customer Relationship Management (CRM) software. These basic product lines are transaction-based, which means that a reasonable metric to employ in pricing is, the quantity of users who will be accessing the basic product line.

Specialty applications are applications that can require specially trained personnel to maintain the applications, have particular computer system requirements, or do not correlate to the quantity of users accessing the applications. In specialty applications a reasonable metric to employ in pricing is, the volume of activity of the applications and computer systems hosting the applications. In step 615, the user enters the start date for any specialty applications, and computing device 150 (FIG. 1) stores a price.

Next, in step 620, the user chooses if the selected product lines and applications are to be hosted by stand-alone ("stand-alone") computer systems or by existing ("add-on") computer systems. Add-on is restricted to HRMS, Financial applications, and Enterprise Portal customers, with minimal users, and is therefore less expensive than stand-alone pricing. The first product line or application on a customer computer system is always considered stand-alone. Subsequently added product lines or applications are considered add-ons. Add-on qualification requires that there be less than 300 total users and that no other product line or application is an add-on to the same computer system. The customer must bring the pre-existing product lines and applications, and the new product line and applications, into production at the same time. Add-on pricing is only available at the initiation of a Service Level Agreement contract. After an initial installation is done it is more difficult to add a product line or application to a production environment, so adding product lines or applications to the contract later requires that the customer pay stand-alone pricing, whether the customer can use a shared hardware environment or requires a dedicated hardware environment.

Each basic product line and application has a minimum hosting fee, called the product line minimum, associated with a computer system. Step 625 calculates the product line minimum price and stores it in computing device 150. The product line minimum price covers all user-based applications and product lines except collaborative applications. A collaborative application can be an application that enables a customer's employees to manipulate their own data. For example, a collaborative application such as equity management software permits a customer's employees to manage their own equity portfolios, which may store indicia of the stock and stock options held by the customer employee. The collaborative equity management software can provide this data to brokers and agents to facilitate stock transfers. In addition to the product line minimum, collaborative applications require the greater of a monthly fixed dollar amount and the monthly self-service user fee.

One exemplary embodiment has three user categories for user-based applications: power users, field users, and self-service users. A power user is a dedicated user of the product line or application and has complete and frequent access to enter, modify, and delete customer data. Typically a power user accesses customer data daily on a full-time basis. A power user is the standard equivalent for "one power user." Costs can scale from $695 per month to $80 per month depending on the quantity of power users.

A field user is a user who accesses the product line or application on a sporadic basis. The field user can enter, review, and update data or perform query and report-generating functions. Typically the field user accesses data infrequently during a workday, with exceptions occurring at month or quarter-end close. The field user can run queries but does not have access authority to develop or modify queries. Further, the field user cannot perform administrative functions such as security administration, setting up accounts, or setting up business units. A field user is equivalent to 0.324 of a power user, and costs can average around $210-$225 per user per month, depending on the quantity of field users.

A self-service user is a user who has full data entry and change access to customer data, but who is limited to his or her own personal data. For example, self-service users can update their 401k profiles or enter their time and expenses after a business trip. Self-service users access customer data on a weekly, bi-weekly, or monthly basis for a very short period of time. Self service users may not access customer data for any other person and may not enter data of others. The self service user is equivalent to 0.007 of a power user, and costs can scale from $4.87 per user per month to $2.43 per user, depending on the quantity of self-service users. Future embodiments can have more or less than three user categories. Further, the scaling amounts can vary by price or by time period. For example, a field user can scale from $15 to $20 per day.

In step 630, the calculator user enters the quantity of users by type and time period. User types can be power users, field users, and self-service users. For example, the calculator user can enter how many of each category of users will access the product lines and applications during the quarters stated in the contract term. The quantity of users can vary from month to month. In an exemplary embodiment, on the fifth day of every month, any new users can be added to reflect a new price. In another exemplary embodiment, if there is a disparity between the current number of users and the contracted number of users, then the user based pricing is based on the greater of the contracted users or the current number of users in the hosted application product line.

Next, in step 635, computing device 150 converts the user information into power user equivalents as a monthly user dollar amount. For example, eight field users is equivalent to 2.592 power users. In step 640, computing device 150 stores the monthly user dollar amount.

The product lines and applications chosen by a customer have a defined correlation to the quantity of computer systems required to host those product lines and applications. For example, a low cost price includes one computer system for one application. Demonstration, development, testing, and eventually production operations can use one computer system. In an exemplary embodiment, one computer system is an implementation pack. In step 645, the user enters the quantity of implementation packs by time period. If the user needs one implementation pack in the first quarter of each year, then he or she enters the quantities accordingly.

Figure 7:
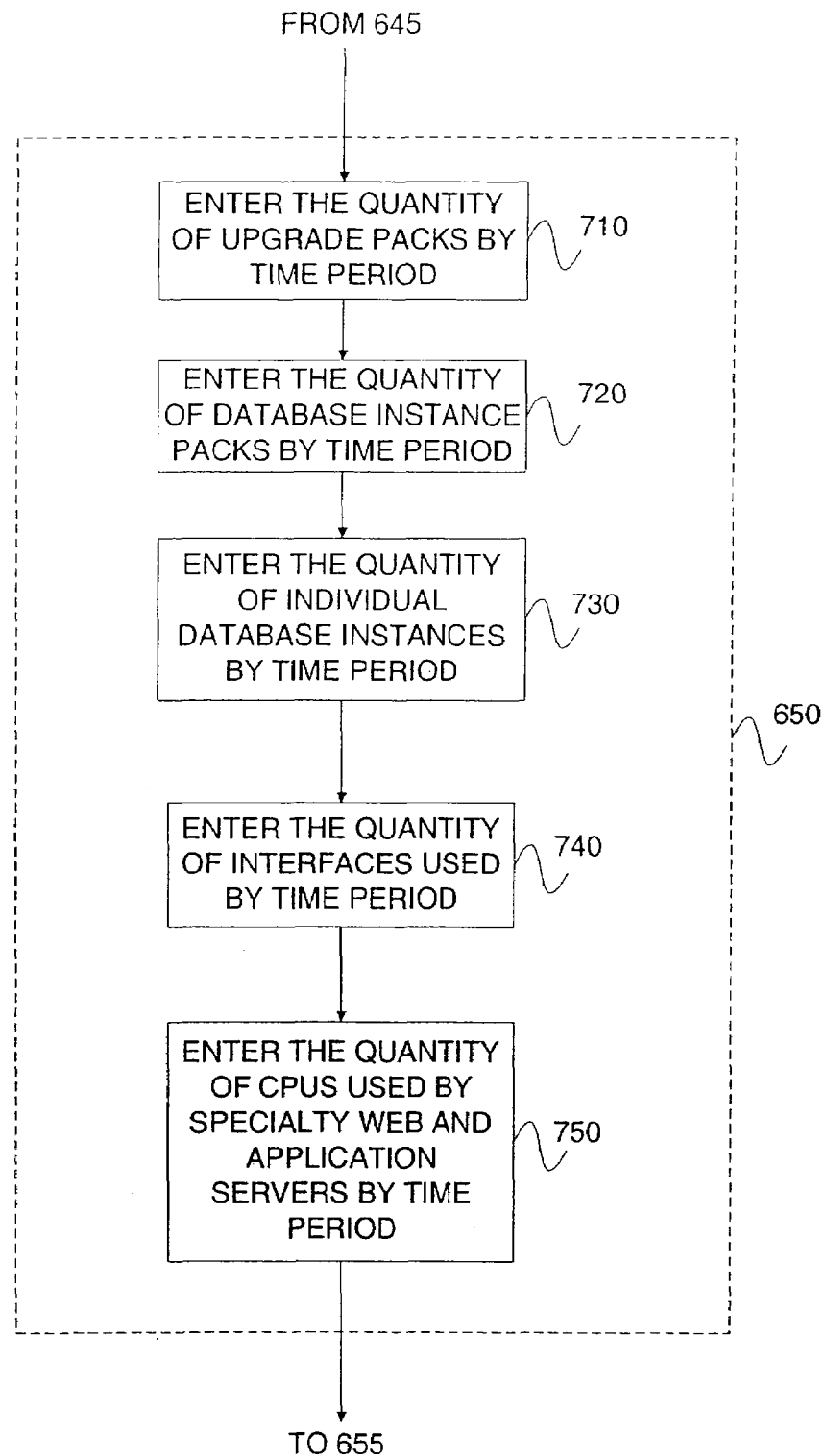
FIG. 7 is a flowchart of steps for entering optional quantities in step 650 of FIG. 6 for pricing a base product offering in accordance with an embodiment of the invention.

In step 650, the user can enter the customer's required optional quantities as detailed in FIG. 7. The user can enter optional quantities of computer system hardware, database instances, which can be for example relational tables, and customer interfaces, which can include additional hardware and software to support the hosting environment.

In step 710, the user can enter the quantity of upgrade packs by time period. An upgrade pack can be two database instances and can be an extra 100 GB of disk 280 (FIG. 2) storage space. Further, for example, the user can select the quantity of upgrade packs by quarter. Next, in step 720, the user can enter the quantity of database instance packs by time period. A database instance pack includes two database instances without disk 280 storage space. In step 730, the user can enter the quantity of individual database instances by time period. Neither the database instance pack nor the individual database instances include extra system administration services. Next in step 740, the user can enter the quantity of interfaces used by time period. The customer can use interfaces to access customer data. The quantity of interfaces is equivalent to the quantity of web computer systems and proprietary visual software displays hosted by the ASP. In step 750, the user can enter the quantity of CPUs used by specialty web and application servers by time period. The choice of quantity of CPUs permits customers to purchase extra computer systems for the selected product lines and applications. In other embodiments, the user can elect to enter quantities for some or all of the options. Further, other embodiments can include more or less options.

Returning to FIG. 6 step 652, computing device 150 calculates and stores the system administration hours, consisting of a formula calculating the monthly product line hosting fees multiplied by a percentage, all divided by the average resource cost per hour, the result of which is rounded to the nearest grouping of hours composed of 25, 50, 75, and 100 hours. System administration hours, can include the time personnel spend on installing, maintaining, and updating computer systems and product lines and applications. Subsequently, in step 655, the user validates that the system administration services are auto-populated. The auto-populated data should reflect numbers by time period. Next, in step 660, the user validates the number of CPUs by product line and application. The auto-populated data should reflect the number of CPUs intended for the selected product lines and applications by time period. In step 665, the user validates the price per user. For example, if only power users are using the product lines and applications, then the auto populated data should reflect the price per power user by time period.

In step 670, computing device 150 selects between the greater of the product line minimum and the user based pricing dollar amount as the base product offering pricing minimum. Next, computing device 150 in step 675 adds on the specialty application pricing and in step 680 adds on the optional service pricing. In step 685 computing device 150 stores the application product line price to complete the base product offering pricing.

Figure 8:
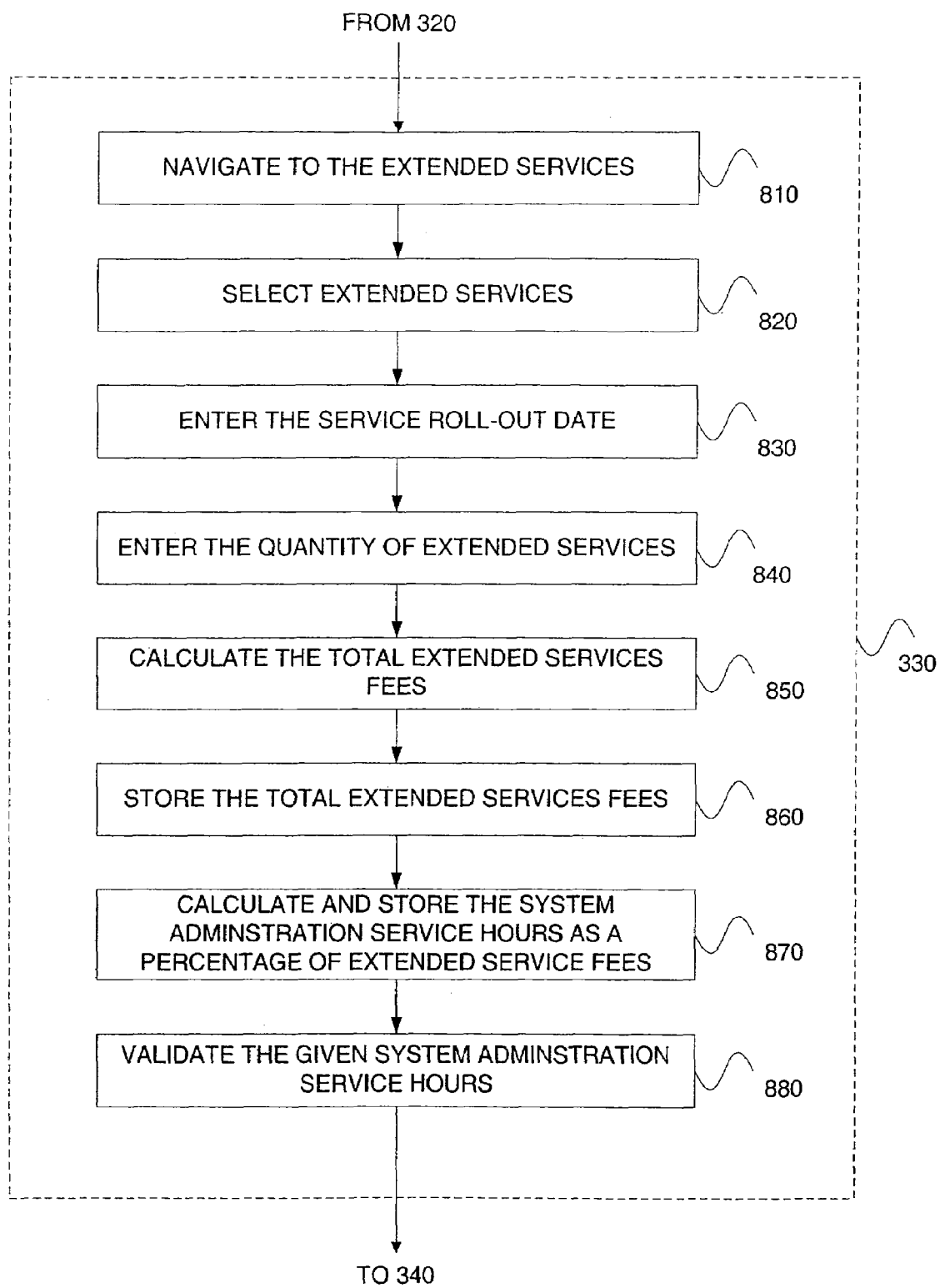
FIG. 8 is a flowchart of steps for pricing extended services in step 330 of FIG. 3 in accordance with an embodiment of the invention.

FIG. 8 shows details of FIG. 3 step 330 for pricing extended services. In step 810, the user navigates to the extended services, which are preferably displayed in a worksheet. In other embodiments, the extended services can be displayed by a proprietary software program with a visual display. Next, in step 820, the user selects the extended services. Exemplary extended services include additional storage space, and unscheduled backups of customer data. In step 830, the user enters the service roll-out date. For example, when selecting backup services, the customer defines the roll-out or start date of the backup services. Next in step 840, the user enters the quantity of extended services. For example, if selecting additional storage space, then the quantity is expressed in GB.

In step 850, computing device 150 (FIG. 1) calculates the total extended services fees. Extended services pricing can be a monthly fixed fee or a one-time fee. Computing device 150 in step 860 stores the total extended services fees and in step 870 calculates and stores the system administration hours as a percentage of extended service fees. In step 880, the user validates the given system administration service hours that are auto-populated. The system administration service hours are shown on a per month basis.

FIG. Shows details of FIG. 3 step 340 for calculating a total price. Step 905 assembles the stored data for calculations by computing device 150 (FIG. 1). Next, in step 910, computing device 150 sums all product line and application pricing.

Then, computing device 150 in step 915 sums all extended service fees, and in step 920 calculates the base hosting fees. In step 925, if Concierge was selected, then in step 930, computing device 150 uplifts (raises) the price by 30%. After calculating all the previous fees and pricing in step 935, computing device 150 has a revised total base hosting fee. In other embodiments, the uplift percentage can be different than 30%. For example, if a customer demands extraordinary customer service, the uplift percentage might be 40%.

Next, in step 940, computing device 150 determines whether to uplift or discount the base hosting fees based on the contract term. For example, if the contract term is 12 months then in step 970 the price is uplifted by 25%. If the contract term is 24 months then in step 975 the price is uplifted by 15%. If the contract term is 36 months then in step 980 the price is unchanged. If the contract term is 48 months then in step 985 the price is discounted by 15%. If the contract term is 60 months, then in step 990, the price is discounted by 15%. In other embodiments the monthly terms and uplift or discount percentages can vary.

Figure 10:
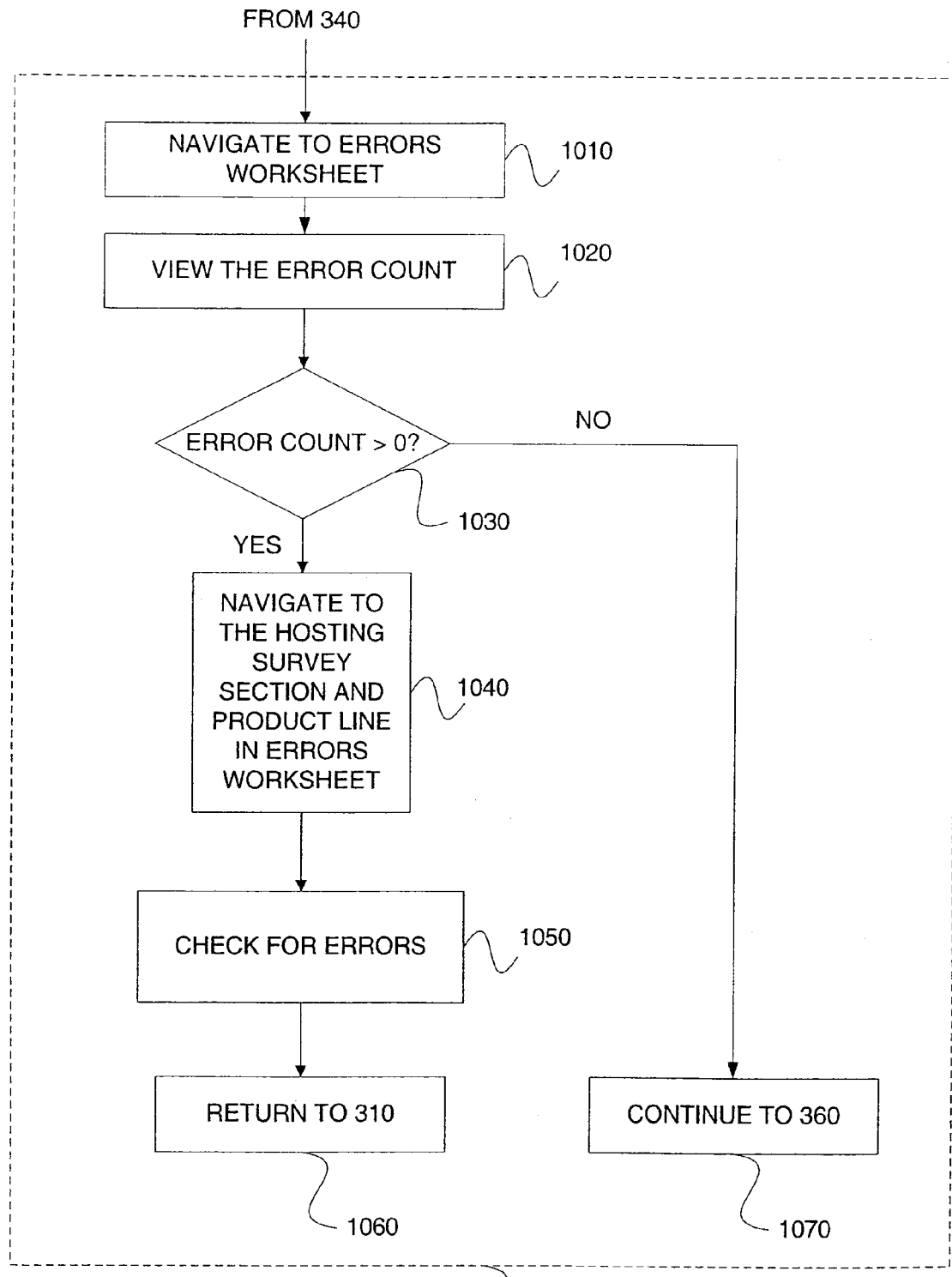
FIG. 10 is a flowchart of steps in checking for errors in pricing in step 350 of FIG. 3 in accordance with an embodiment of the invention.
Figure 11:
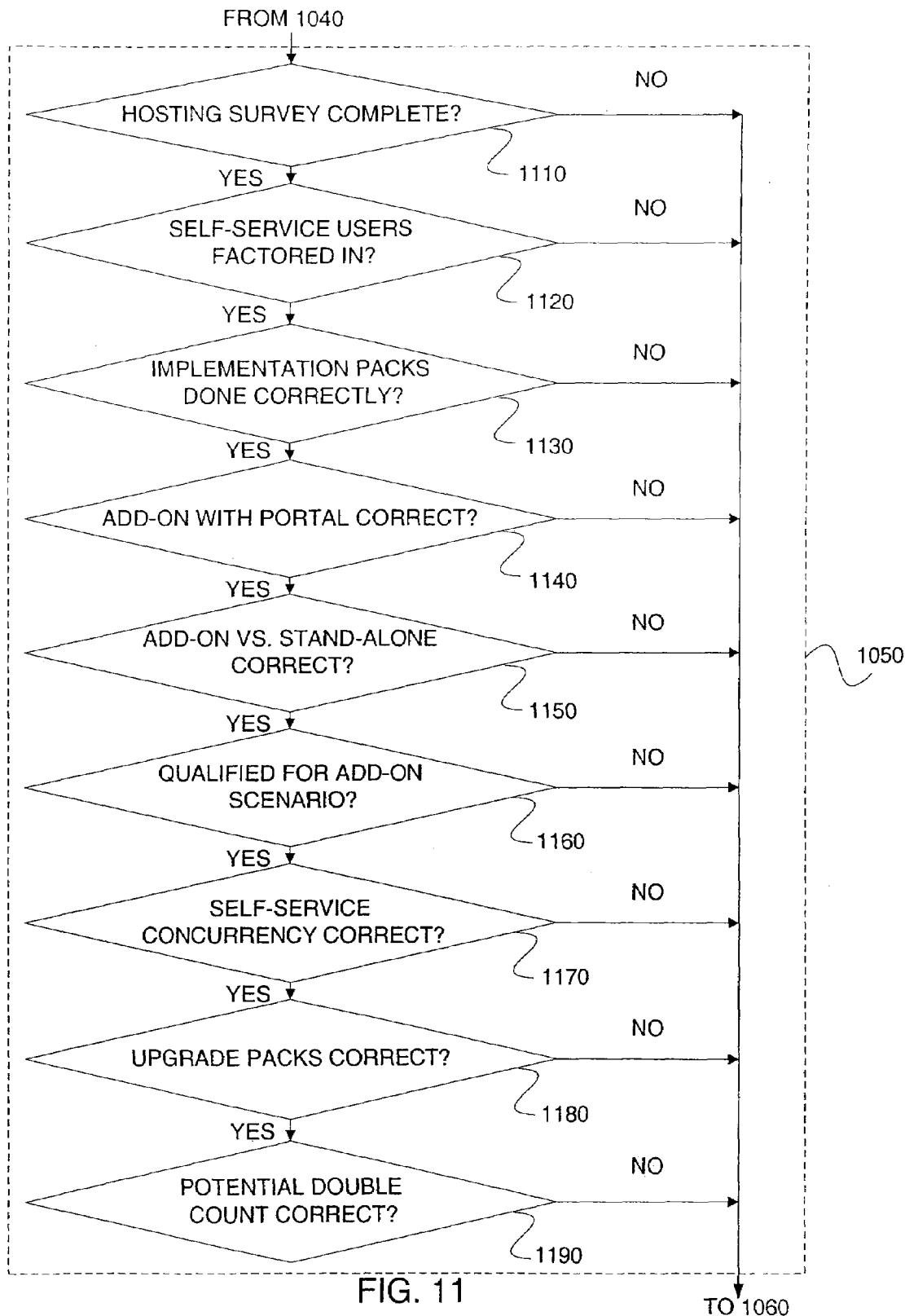
FIG. 11 is a flowchart of steps for checking for specific errors in step 1050 of FIG. 10 in accordance with an embodiment of the invention.

FIG. 10 details FIG. 3 step 350 of checking for pricing errors. In step 1010, the user navigates to the errors worksheet. Next, in step 1020, the user views the error count. In step 1030 if the error count is zero then the user continues to step 360 (FIG. 3). If the error count is greater than zero then in step 1040 the user navigates to the hosting survey section and product line in the errors worksheet. In step 1050, the user checks for pricing errors as detailed in FIG. 11.

If any of the checks in step 1050 reveals an error then the method returns to step 310 of FIG. 3. In step 1110, the user checks whether the hosting survey is complete. In step 1120 the user checks whether self-service users have been factored in. In step 1130 the user checks whether the implementation packs have been done correctly. In step 1140 the user checks whether the add on with a portal is correct. In an exemplary embodiment, a portal can be software that facilitates entry into an enterprise system. Further, an enterprise system can include a network of computer systems hosting software applications. In step 1150, the user checks whether add-on vs. stand-alone is correct. For example, the user should note if the product line and applications are correctly hosted on stand-alone or add-on computer systems. In step 1160, the user checks whether the customer is qualified for an add-on scenario. In step 1170, the user checks whether self-service concurrency is correct. In step 1180, the user checks whether the upgrade packs are correct. In step 1190, the user checks whether there is a potential double count, for example of collaborative applications, which can be an error. In other embodiments, checking for errors in step 1050 (FIG. 10) can include more or less steps. Further, the steps can be executed automatically by computing device 150.

Figure 12:
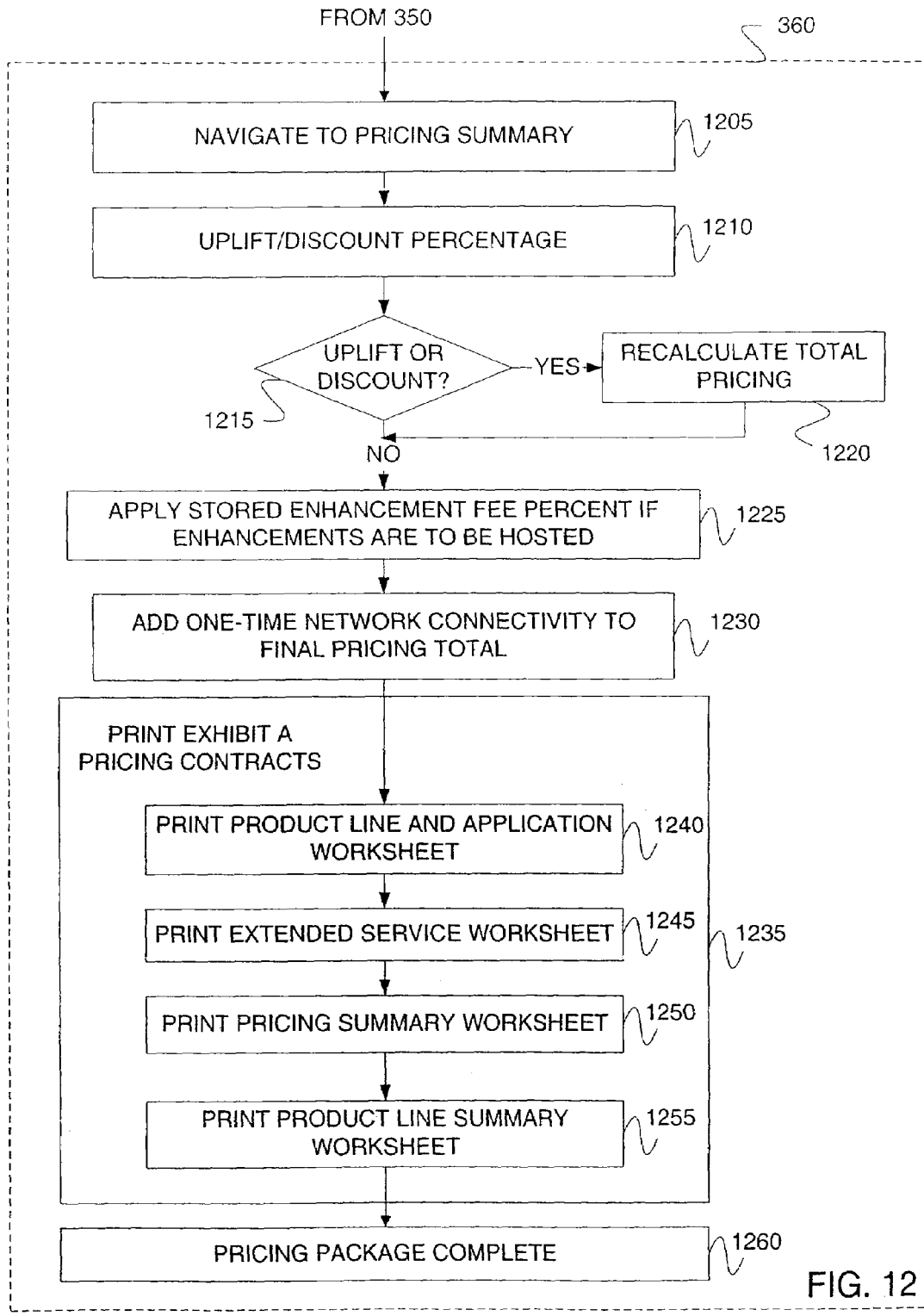
FIG. 12 is a flowchart of steps for presenting a pricing summary in step 360 of FIG. 3 in accordance with an embodiment of the invention.

FIG. 12 shows details of FIG. 3 step 360 for presenting a pricing summary. In step 1205 the user navigates to the pricing summary. In step 1210 the user can enter an uplift or discount percentage to increase or decrease the price. In step 1215 computing device 150 (FIG. 1) checks for an uplift and/or discount percentage. If there is an uplift and/or discount percentage, then in step 1220 computing device 150 recalculates the total pricing.

In step 1225, if enhancements are to be hosted then computing device 150 applies the stored enhancement fee percent. Next, in step 1230, computing device 150 adds a one-time network connectivity fee to the final pricing total.

In step 1235 the user can print exhibit A pricing contracts. Printouts include the product line and application worksheet in step 1240, the extended summary worksheet in step 1245, the pricing summary worksheet in step 1250, and the product line summary worksheet in step 1255. All of the printouts can be added to the contract. In other embodiments, either calculator the user or computing device 150 can print any or all of the worksheets. Further, a proprietary software program with a visual display can print the same worksheet data in another format. Alternatively, computing device 150 can transmit the data over network 130 via external connection 110 and/or internal connection 120 (FIG. 1) to a customer or other business partner.

The invention has been explained above with reference to specific embodiments. Other embodiments will be apparent to those skilled in the art in light of this disclosure. The invention may readily be implemented using configurations other than those described in the embodiments above. Additionally, the invention may effectively be used in conjunction with systems other than the one described above. Therefore, these and other variations upon the above embodiments are intended to be covered by the appended claims.

What is claimed is:

1. A method in a computer system of determining a price for a remote hosting service, comprising:

choosing a product offering of the remote hosting service;

calculating a minimum price for at least one application to be remotely hosted as part of the chosen product offering;

converting a number of users of a first user category into power user equivalents and storing a monthly user dollar amount based on a number of power users and the power user equivalents, a power user having full access at substantially any time to manipulate data for the at least one application as part of the product offering, a user of the first user category having less than full access at substantially any time such that a power user equivalent for the user counts as a fraction or percentage of a power user toward the monthly user dollar amount;

calculating a product offering pricing minimum by selecting the greater of the monthly user dollar amount and the minimum price for the at least one application to determine an initial price for the product offering to be remotely hosted;

calculating a total remote hosting price including a sum of the initial price for the product offering price and a calculated price for extended services; and generating output indicative of a pricing summary including the total remote hosting price.

2. A method according to claim 1, wherein:
choosing the product offering includes at least one of determining that a criteria is met by user information, choosing a contract term, and calculating an enhancement to the at least one application.

3. A method according to claim 2, wherein calculating the enhancement includes:
selecting a modification, and a quantity thereof, for the at least one application; and
multiplying the quantity by an enhancement weighting factor to determine a number of enhancement points.

4. A method according to claim 3, wherein:
calculating the enhancement further includes generating a hosting survey.

5. A method according to claim 3, wherein the at least one application includes two or more applications and calculating the enhancement further includes:
determining a number of enhancement points for each of the two or more applications; and
calculating a sum of the numbers of enhancement points.

6. A method according to claim 3, wherein:
calculating the enhancement further includes determining a scaling percentage for the enhancement.

7. A method according to claim 3, wherein:
calculating the enhancement further includes determining a scaling percentage for the enhancement only if a condition is satisfied.

8. A method according to claim 7, wherein:
the condition includes a threshold number of enhancement points.

9. A method according to claim 1, wherein:
the at least one application includes a specialty application and calculating the minimum price for the specialty application includes specifying a start date.

10. A method according to claim 1, wherein:
one of the at least one application is subject to stand-alone pricing.

11. A method according to claim 10, wherein:
the at least one application includes two or more applications and calculating the minimum price for the at least one application includes qualifying at least one of the two or more applications for add-on pricing.

12. A method according to claim 1, wherein:
the at least one application includes two or more applications, each having a minimum hosting fee, and calculating the minimum price for the two or more applications includes calculating a sum of the minimum hosting fees.

13. A method according to claim 1, wherein:
determining the product offering price further includes determining a number of computer systems required to host the at least one application.

14. A method according to claim 1, wherein:
determining the product offering price further includes determining an optional quantity selected from the group consisting of computer system hardware, database instances, customer interfaces, and combinations thereof.

15. A method according to claim 1, wherein:
determining the product offering prices further includes calculating system administration service hours required to host the at least one application.

16. A method according to claim 1, wherein:
determining the product offering prices further includes calculating a sum of the product offering pricing minimum, a specialty application pricing, and an optional services pricing.

17. A method according to claim 1, wherein:
determining the price for extended services includes selecting an extended service and a quantity thereof.

18. A method according to claim 17, wherein:
the extended service is selected from the group consisting of additional storage space, unscheduled backups of customer data, and a combination thereof.

19. A method according to claim 17, wherein determining the price for extended services further includes:
determining a fee for the quantity of the selected extended service; and
calculating a number of system administration service hours as a percentage of the fee.

20. A method according to claim 1, wherein:
calculating the total price further includes revising by a percentage the sum of the product offering price and the price for extended services.

21. A method according to claim 20, wherein:
the percentage depends on one of a contract term and a type of application being included in the at least one application.

22. A method according to claim 1, wherein:
presenting the pricing summary further includes adding a one-time network connectivity fee to the total price.

23. A method according to claim 1, further comprising:
checking for pricing errors before presenting the pricing summary.

24. A computer program product embedded in a computer readable medium for determining a price for a remote hosting service, comprising:
program code for choosing a product offering of the remote hosting service;
program code for calculating a minimum price for at least one application to be remotely hosted as part of the chosen product offering;
program code for converting a number of users of a first user category into power user equivalents and storing a monthly user dollar amount based on a number of power users and the power user equivalents, a power user having full access at substantially any time to manipulate data for the at least one application as part of the product offering, a user of the first user category having less than full access at substantially any time such that a power user equivalent for the user counts as a fraction or percentage of a power user toward the monthly user dollar amount;
program code for calculating a product offering pricing minimum by selecting the greater of the monthly user dollar amount and the minimum price for the at least one application to determine an initial price for the product offering to be remotely hosted;
program code for calculating a total remote hosting price including a sum of the initial price for the product offering price and a calculated price for extended services; and
program code for generating output indicative of a pricing summary including the total remote hosting price.

25. A computer program product according to claim 24, wherein program code for choosing the product offering includes program code for calculating an enhancement to the at least one application.

26. A computer program product according to claim 25, wherein program code for calculating the enhancement includes program code for selecting a modification, and a quantity thereof, for the at least one application, as well as program code for multiplying the quantity by an enhancement weighting factor to determine a number of enhancement points.

27. A computer program product according to claim 25, wherein the at least one application includes two or more applications and program code for calculating the enhancement further includes program code for determining a number of enhancement points for each of the two or more applications and program code for calculating a sum of the numbers of enhancement points.

28. A computer program product according to claim 25, wherein:

program code for calculating the enhancement further includes program code for determining a scaling percentage for the enhancement.

29. A computer program product according to claim 24, wherein:

program code for calculating the product offering price further includes program code for determining a number of computer systems required to host the at least one application.

30. A computer program product according to claim 24, wherein:

program code for calculating the product offering prices further includes program code for calculating system administration service hours required to host the at least one application.

\* \* \* \* \*

UNITED STATES PATENT AND TRADEMARK OFFICE
CERTIFICATE OF CORRECTION

PATENT NO. : 7,383,202 B2  
APPLICATION NO. : 11/736856  
DATED : June 3, 2008  
INVENTOR(S) : Archibald et al.

Page 1 of 1

It is certified that error appears in the above-identified patent and that said Letters Patent is hereby corrected as shown below:

On the face page, in field (56), in column 2, under "Foreign Patent Documents", line 1, delete "EP 1128309 A2 2/2001".

On page 2, in column 2, under "Other Publications", line 3, delete "Weel," and insert -- Week, --, therefor.

On Sheet 8 of 16, Figure 8, Ref. Numeral 870, line 2, delete "ADMINSTRATION" and insert -- ADMINISTRATION --, therefor.

On Sheet 8 of 16, Figure 8, Ref. Numeral 880, line 1, delete "ADMINSTRATION" and insert -- ADMINISTRATION --, therefor.

Figure 9:
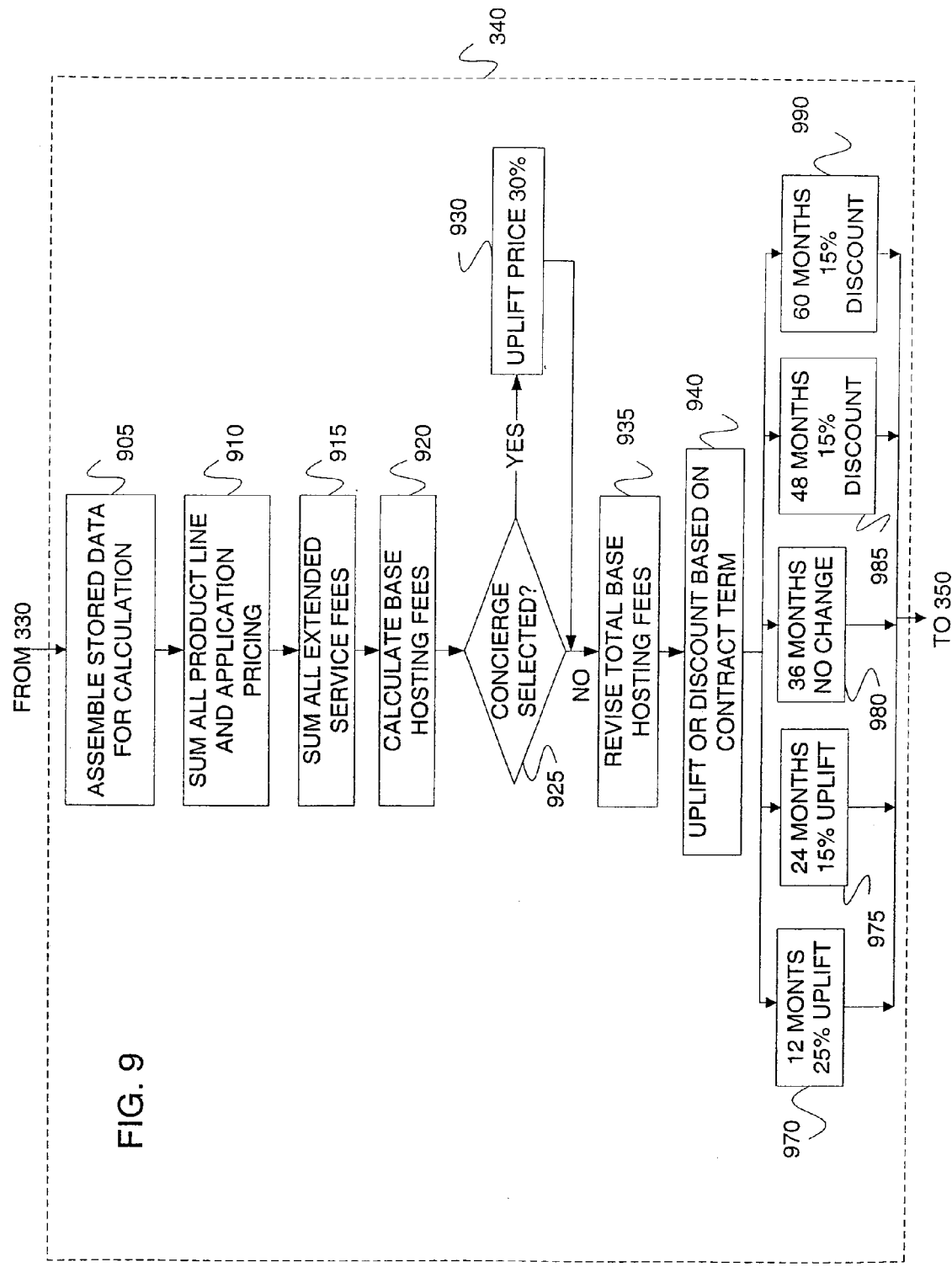
FIG. 9 is a flowchart of steps for calculating a total price in step 340 of FIG. 3 in accordance with an embodiment of the invention.

On Sheet 9 of 16, Figure 9, Ref. Numeral 970, line 1, delete "MONTS" and insert -- MONTHS --, therefor.

In column 1, line 12, delete "are" and insert -- is --, therefor.

In column 9, line 13, after "FIG." insert -- 9 --.

Signed and Sealed this

Seventh Day of July, 2009

JOHN DOLL  
*Acting Director of the United States Patent and Trademark Office*